US012704172B2

(12) United States Patent
Wink et al.

(10) Patent No.: US 12,704,172 B2
(45) Date of Patent: Aug. 11, 2026

(54) LIGHTWEIGHT AND LOW NOISE GEAR ASSEMBLY

(71) Applicant: Eaton Intelligent Power Limited, Dublin (IE)

(72) Inventors: Carlos Henrique Wink, Portage, MI (US); Bruno Cesar Mussulini, Valinhos-Sp (BR); André Luís De Araujo Marques Leão, Paulínia-Sp (BR); Natasha Queiroz Nogueira De Souza, São Paulo (BR); Paulo Roberto Teixeira Da Silva, Campinas-Sp (BR); Marco Aurélio Luiz De Oliveria, Valinhos (BR)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/690,590

(22) PCT Filed: Sep. 9, 2022

(86) PCT No.: PCT/EP2022/025422
§ 371 (c)(1),
(2) Date: Mar. 8, 2024

(87) PCT Pub. No.: WO2023/036468
PCT Pub. Date: Mar. 16, 2023

(65) Prior Publication Data

US 2025/0137520 A1 May 1, 2025

Related U.S. Application Data

(60) Provisional application No. 63/242,563, filed on Sep. 10, 2021.

(51) Int. Cl.
*F16H 55/06* (2006.01)
*F16H 55/17* (2006.01)

(52) U.S. Cl.
CPC ............ *F16H 55/06* (2013.01); *F16H 55/17* (2013.01)

(58) Field of Classification Search
CPC .......... F16H 55/06; F16H 55/17; F16H 55/18; F16H 55/14; F16H 57/0025
(Continued)

(56) References Cited

U.S. PATENT DOCUMENTS 1,524,555 A * 1/1925 Kempton ................ F16H 55/06 74/446
1,908,187 A 5/1933 Ross
(Continued)

FOREIGN PATENT DOCUMENTS

CN 201037535 3/2008
CN 104923889 B 10/2017
(Continued)

OTHER PUBLICATIONS

International Search Report and Written Opinion for Application No. PCT/EP2022/025422 mailed Jan. 30, 2023.
(Continued)

*Primary Examiner* — Terence Boes
(74) *Attorney, Agent, or Firm* — Merchant & Gould P.C.

(57) ABSTRACT

A lightweight and low noise gear assembly includes a gear assembly that includes a hub, at least one disc, and a ring gear component, wherein two or more of the hub, the at least one disc and the ring gear component are welded together. A lightweight and low noise gear assembly includes a shaft assembly that includes a ring gear, and at least one disc joined with the ring gear. A method of forming a gear assembly, the gear assembly including a hub, at least one disc, and a ring gear component, the method including
(Continued)

press-fitting the at least one disc onto the hub and the ring gear, and welding the at least one disc and the ring gear to the hub.

10 Claims, 15 Drawing Sheets

(58) Field of Classification Search
USPC ........................................... 74/434, 445, 446
See application file for complete search history.

(56) References Cited

U.S. PATENT DOCUMENTS

| | | | |
|---|---|---|---|
| 2,051,498 A | 8/1936 | Short | |
| 2,756,607 A | 7/1956 | Mochel et al. | |
| 3,200,665 A | 8/1965 | Martin | |
| 4,118,848 A * | 10/1978 | Goldschmidt | B23P 15/14 228/232 |
| 10,865,867 B2 | 12/2020 | Anand et al. | |
| 2010/0201030 A1 | 8/2010 | Oberle | |
| 2011/0250070 A1 | 10/2011 | Jens | |

FOREIGN PATENT DOCUMENTS

| | | |
|---|---|---|
| DE | 10127224 | 12/2002 |
| DE | 102019209056 | 12/2020 |
| EP | 3 800 374 A1 | 4/2021 |
| JP | S51-11049 B1 | 4/1976 |
| WO | 2013122282 | 8/2013 |
| WO | 2014/040927 A1 | 3/2014 |
| WO | 2023179916 | 9/2023 |
| WO | 2025219888 | 10/2025 |

OTHER PUBLICATIONS

International Search Report and Written Opinion for Application No. PCT/EP2023/025134 mailed Jun. 1, 2023.

Souza et al., “Light-Weight Assembled Gears: A Green Design Solution for Passenger and Commercial Vehicles”, Geartechnology, May 2013, www.geartechnology.com.

Li, Shuting, “Contact Stress and Root Stress Analyses of Thin-Rimmed Spur Gears with Inclined Webs”, Journal of Mechanical Design, vol. 134/051001-1, May 2012.

Laberge et al., “Evaluation of a Variable Thickness Hybrid Composite Bull Gear”, Presented at the AHS International 74th Annual Forum and Technology Display, Pheonix, Arizona, USA, May 14-17, 2018.

Handschuh et al., “Vibration and Operational Characteristics of a Composit-Steel (Hybrid) Gear”, Power Transmission Engineering, pp. 80-87, Dec. 2017 www.powertransmission.com.

Politis, et al., “Review of receent developments in manufacturing lightweight multi-metal gears”, Production Engineering (2021) 15:235-262, Jan. 6, 2021 https:/doi.org/10.1007/s11740-020-01011-5.

* cited by examiner

LIGHTWEIGHT AND LOW NOISE GEAR ASSEMBLY

CROSS-REFERENCE TO RELATED APPLICATION

This application is a National Stage Application of PCT/EP2022/025422, filed on Sep. 9, 2022, which claims the benefit of U.S. Provisional Application Ser. No. 63/242,563, filed on Sep. 10, 2021, the disclosures—of which are hereby incorporated by reference in their entireties. To the extent appropriate, a claim of priority is made to each of the above disclosed applications.

FIELD OF THE INVENTION

Examples of this disclosure are directed to a gear assembly that includes a ring gear, a hub, and one or more thin discs that may be welded to the hub and the ring gear.

SUMMARY

One aspect of examples of the present disclosure includes a gear assembly that includes a hub, at least one disc, and a ring gear component, wherein two or more of the hub, the at least one disc, and the ring gear component are welded together. In examples, the hub, the at least one disc, and the ring gear component are welded together at a plurality of weld joints. In an example, the weld joints are at a plurality of locations of the gear. For example, the at least one disc is a circular member. In another example, the at least one disc includes at least one of an ASTM A572 material and a 8620 steel material. In yet another example, one of the hub, the at least one disc, and the ring gear component includes a different material from another of the hub, the at least one disc, and the ring gear component. In other examples, a relief is included between the hub and the at least one disc. For example, the relief has a size of about 1.5 millimeters and is inclined at an angle of about 15 degrees. As another example, the relief is configured to enable the at least one disc and the hub to maintain their respective positions during a welding operation thereof.

In other examples of the above aspect, the hub includes a plurality of steps configured to position the at least one disc relatively to the hub during a welding operation thereof. In an example, the at least one disc includes a single disc. In another example, the at least one disc includes a dual disc configuration, the dual disc configuration including a first disc having a first thickness and a second disc having a second thickness lower than the first thickness. For example, an orientation of the second disc is parallel to an orientation of the first disc. In other examples, the at least one disc includes a dual disc configuration, the dual disc configuration including a first disc and a second disc having a same thickness as the first disc. In yet another example, the first disc and the second disc are oriented so that the first disc and the second disc cross each other.

In further examples of the above aspect, the at least one disc includes a triple disc configuration, the triple disc configuration including a first disc having a first thickness, a second disc having a second thickness, and a third disk having a third thickness. In a further example, the third disc has a shape of a truncated circular cone. In yet another example, the first thickness, the second thickness, and the third thickness are equal to each other. In other examples, the second thickness is lower than the first thickness and lower than the third thickness. In an example, a weight of the gear assembly is in a range of 3.75 Kg to 4.945 Kg. In another example, a vibration noise of the gear assembly is in a range of 106-134 dB. In further examples, a first harmonic of the vibration noise is equal to about 134 dB, a second harmonic of the vibration noise is equal to about 123 dB, and a third harmonic of the vibration noise is equal to about 106 dB.

Another aspect of examples of the present disclosure includes a shaft assembly that includes a ring gear and at least one disc joined with the ring gear. For example, the at least one disc is joined with the ring gear via at least one of adhering and welding. As another example, the shaft assembly does not include a hub.

Another aspect of examples of the present disclosure includes a method of forming a gear assembly, the gear assembly including a hub, at least one disc, and a ring gear component, the method including press-fitting the at least one disc onto the hub and the ring gear, and welding the at least one disc and the ring gear to the hub. In various examples, the gear assembly further includes a relief between the hub and the at least one disc, and welding the at least one disc and the ring gear to the hub includes applying a welding bead on the relief. In other examples, the hub includes a plurality of steps, and press-fitting the at least one disc onto the hub and the ring gear includes positioning the at least one disc relatively to the hub at the plurality of steps.

BRIEF DESCRIPTION OF THE DRAWINGS

The aspects set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
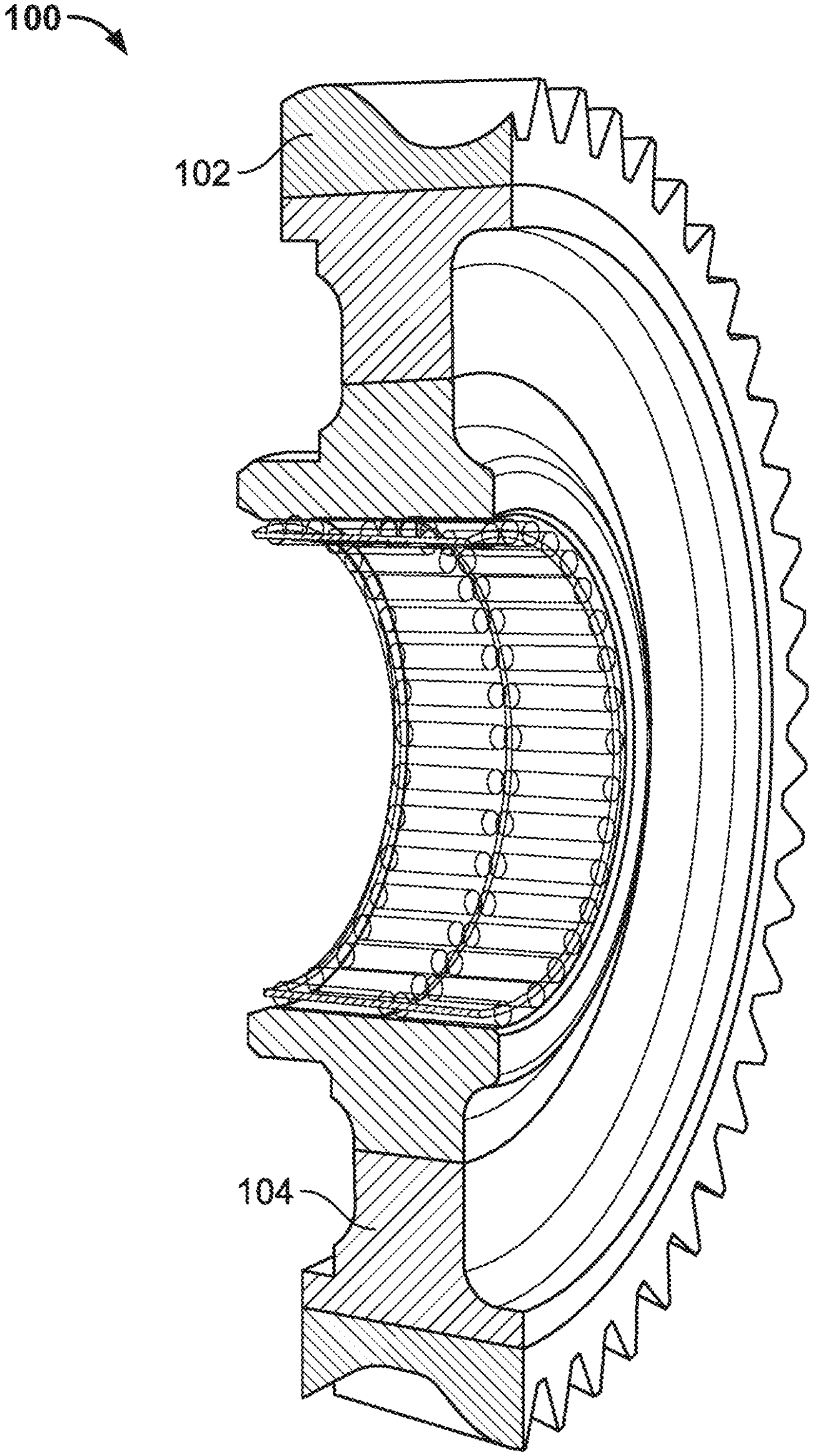
FIG. 1 depicts a cross section of a gear assembly having a conventional design.

Conventional gear assemblies are typically formed of the same material and have a web and rim based geometry, as illustrated in FIG. 1. These gear assemblies have a number of shortcomings. In particular, conventional gear assemblies are typically heavy and have suboptimal noise, vibration, and harshness ("NVH") characteristics, primarily due to limitations associated with manufacturing processes such as, e.g., the heat treatment distortions that are needed to manufacture these assemblies. The gear assembly as described in the present disclosure addresses and overcomes these deficiencies. In particular, the gear assembly as described in the present disclosure is light weight and designed such that the NVH characteristics of the assembly is better than the NVH characteristics of conventional gear assemblies. Additionally, it is noted that various finishing operations such as internal diameter grinding, hard finishing of tooth flanks, and so forth, are performed after the gear assembly is assembled.

In various examples, the gear assembly of the present disclosure, during operation, has lower NVH characteristics as compared to conventional gear assemblies, due to, e.g., the geometry of the components included as part of the gear assembly such as, e.g., the geometries of the hub, disc, ring gear components. The manner in which these components are joined to each other may also facilitate a reduction in the NVH characteristics. In other examples, the gear assembly of the present disclosure has better NVH characteristics as compared to the conventional gear assembly due to, e.g., the geometries of each of the hub, disc, and ring gear enabling the gear assembly to be more flexible as compared to conventional gear assemblies.

Other examples of the present disclosure include a lightweight, low-noise gear assembly concept that consists of, or includes, a ring gear, a hub, and one or more thin discs. For example, the thin discs are welded to the ring gear and hub to create a lightweight, low noise gear assembly. Accordingly, the ring gear and discs may be welded directly to the shaft for additional weight and cost reduction. Various examples of this disclosure provide a solution for significant weight reduction of gears and shafts, along with noise reduction. For example, the example gear assembly according to the examples of this disclose result in a 25% to 46% weight reduction, and a 2 dB to 5 dB noise reduction compared to a conventional gear assembly. For example, the weight reduction can be translated into savings in material costs of the component, a longer range of useful life for, e.g., electric vehicles, and a higher payload for, e.g., commercial vehicles.

FIG. 1 depicts a cross section of a gear assembly having a conventional design. As illustrated, a cross section of a gear assembly 100 with a conventional design includes a rim 102 and a web configuration 104. Such conventional gears and gear assemblies are typically made of steel, and are manufactured by forging, machining, heat treatment, and hard finish. Conventional gears such as the gear illustrated in FIG. 1 typically suffer from a number of deficiencies. In particular, as a result of the manufacturing processes utilized to make the gear assemblies, these assemblies are typically bulky and have a significant weight. Additionally, as stated above, the conventional gears are noisy in operation.

Figure 2:
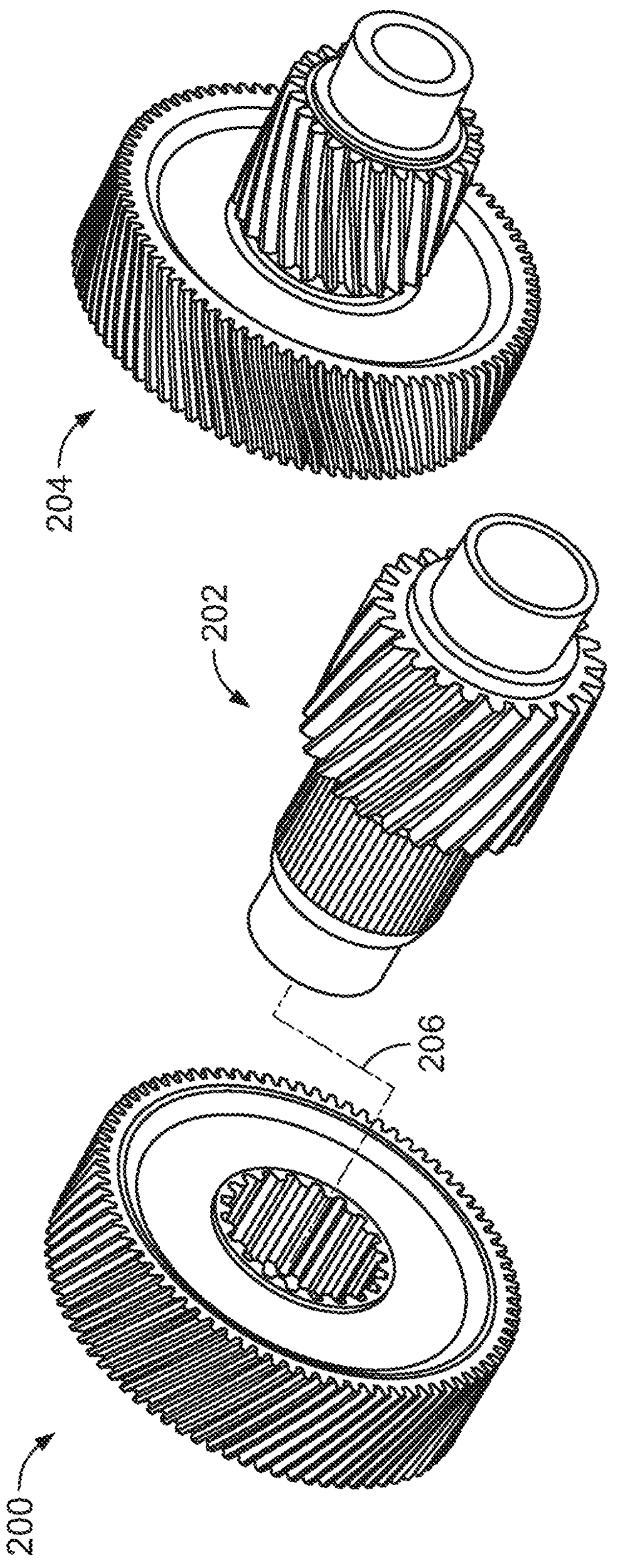
FIG. 2 depicts a gear and shaft assembly having a conventional design.

FIG. 2 depicts a gear and shaft assembly having a conventional design. In particular, FIG. 2 depicts an example design of a conventional gear 200, a conventional shaft 202, and a conventional intermediate shaft assembly 204 (i.e., a countershaft). The gear 200 and the shaft assembly 204 are illustrated as separate parts that are assembled or joined together along axis 206, which may involve the use of, e.g., a spline joint, a press fit, a keyway, or welding. The conventional gear 200 may also include a counter shaft or intermediate shaft 204 that is formed of a single piece (e.g., a single steel component). Due to manufacturing constraints, there may be a certain distance or interval between the conventional gear 200 and the conventional shaft 202.

Figure 3A:
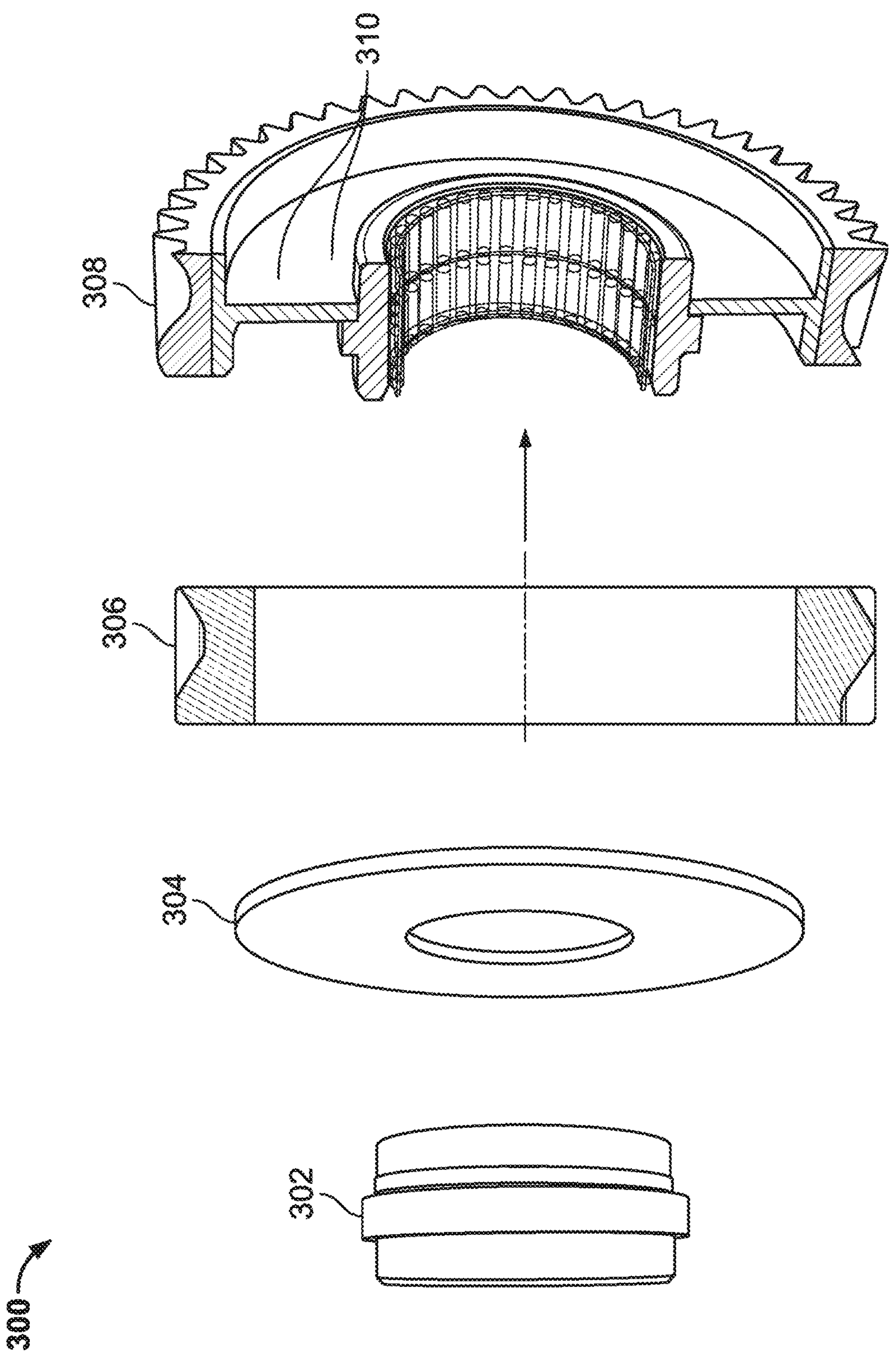
FIG. 3A depicts a gear assembly that addresses and overcomes the deficiencies of conventional gear assemblies, according to one or more embodiments described and illustrated herein.

FIG. 3A depicts a gear assembly according to examples of the present disclosure. In particular, the gear assembly 300 may include a hub 302, a disc 304, a ring gear component 306, and a gear 308. The gear 308 may be formed by welding together the hub 302, the disc 304, and the ring gear component 306. The gear 308 may include a plurality of weld joints 310. The disc 304 is a thin, circular member that may be formed of material such as, e.g., ASTM A572, or other comparable materials. In various examples, different materials may be utilized to form each of the hub 302, the disc 304, and the ring gear 306, as each of these components may have varying strength requirements or strength profiles. As such, some components may be formed of materials that are cheaper than the materials used to form the other components, and as a result, the overall cost of the gear assembly 300 may be lowered compared to a conventional gear assembly. In various examples, weld joints such as weld joints 310, may be positioned on other portions of the gear 308 as well.

Figure 3B:
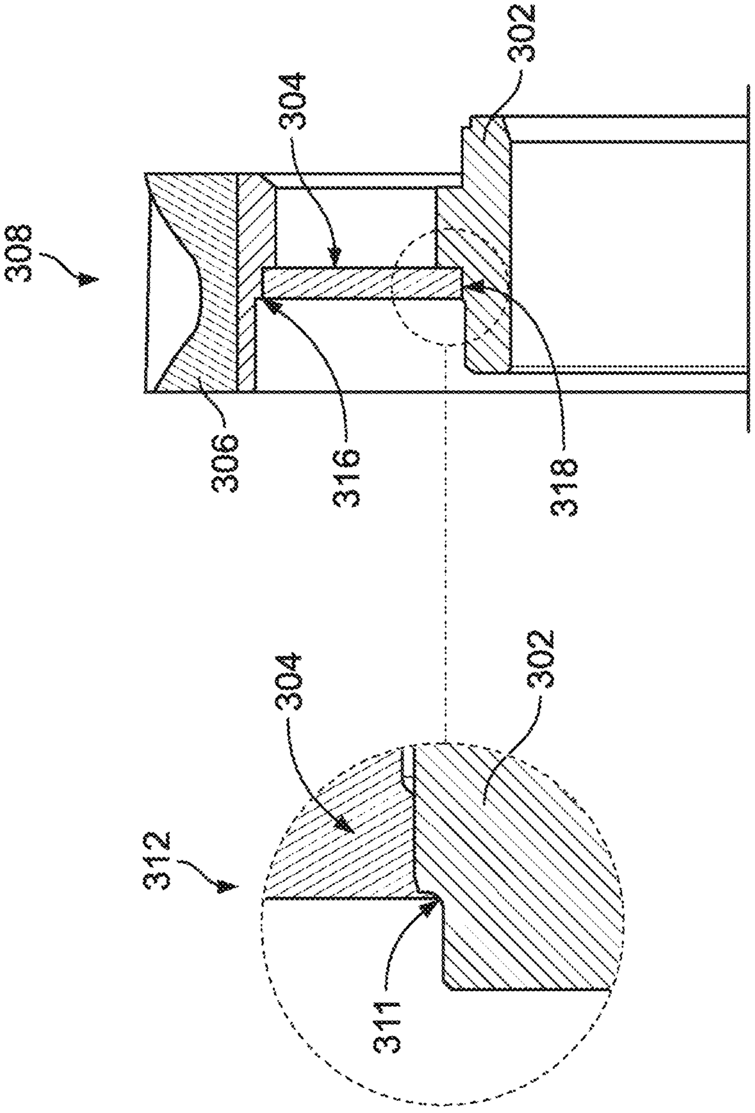
FIG. 3B depicts a schematic representation of the hub, the disc, the ring gear component, and the gear assembly of the present disclosure, according to one or more embodiments described and illustrated herein.

FIG. 3B depicts a schematic representation of the hub 302, the disc 304, the ring gear component 306, and the gear 308, according to various examples of this disclosure. In embodiments, laser welding operations may be performed such that the disc 304 may be lightly press fitted onto the hub 302 and the ring gear 306, and permanently attached by welding. In various examples, prior to performing the welding and assembly operation, a hardened case may be removed from the area in which the hub 302, the disc 304, and the ring gear component 306 interface. Schematic 312 illustrates the disc 304 and the hub 302 interfacing with each other. In an example, there is a relief 311 between the hub 302 and the disc 304, the relief 311 measuring approximately, e.g., 1.5 millimeters, and having an angle of approximately, e.g., 15 degrees. The relief 311 may be configured to enable the laser welding operation, in particular, to enable the laser weld to apply a bead. In examples, the relief 311 provides a manufacturing tolerance that enables a laser welding operation. The relief 311 may also enable the disc 304 and the hub 302 to maintain their respective positions while the welding operation is performed. In examples, when the disc 304 is press fitted against the hub 302, steps 316, 318, provided at multiple locations on the hub 302, enable the disc 304 to be appropriately positioned relative to the hub 302 while the welding operation is performed.

Figure 4:
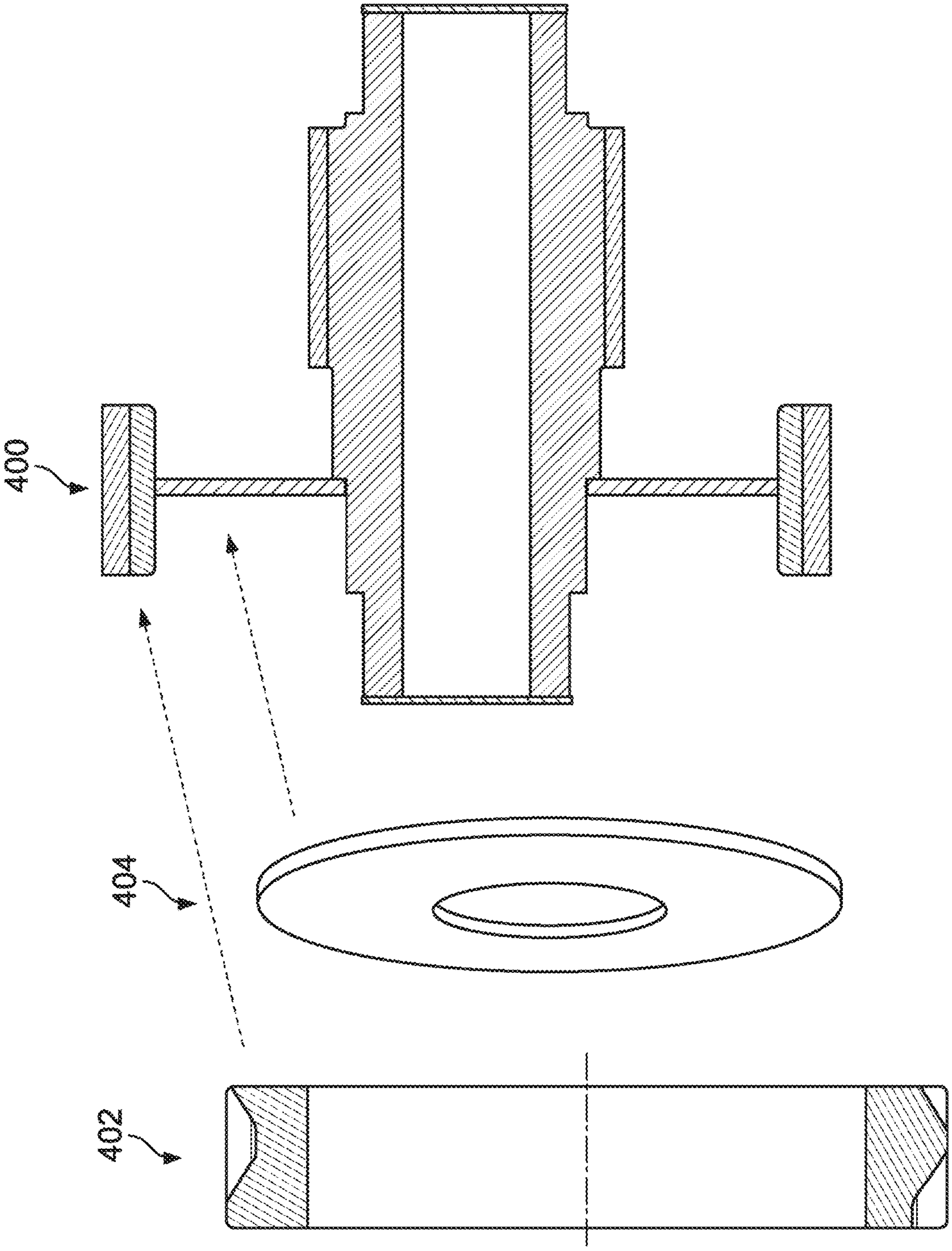
FIG. 4 depicts a countershaft of the present disclosure that addresses and overcomes the deficiencies of the gear and the shaft assembly having a conventional design, according to one or more embodiments described and illustrated herein.

FIG. 4 depicts a countershaft or intermediate shaft assembly, according to examples of the present disclosure, that addresses and overcomes the deficiencies of the gear and the shaft assembly having a conventional design. In particular, FIG. 4 depicts an example countershaft or shaft assembly 400, which may include an example ring gear 402 and an example thin disc 404. In various examples, the countershaft or shaft assembly 400 may be formed by joining, adhering, or combining the ring gear 402 with the thin disc 404. In examples, the countershaft or shaft assembly 400 lacks a hub, which reduces the weight of the countershaft or shaft assembly 400, resulting in improved NVH characteristics and increased cost savings.

Figure 5A:
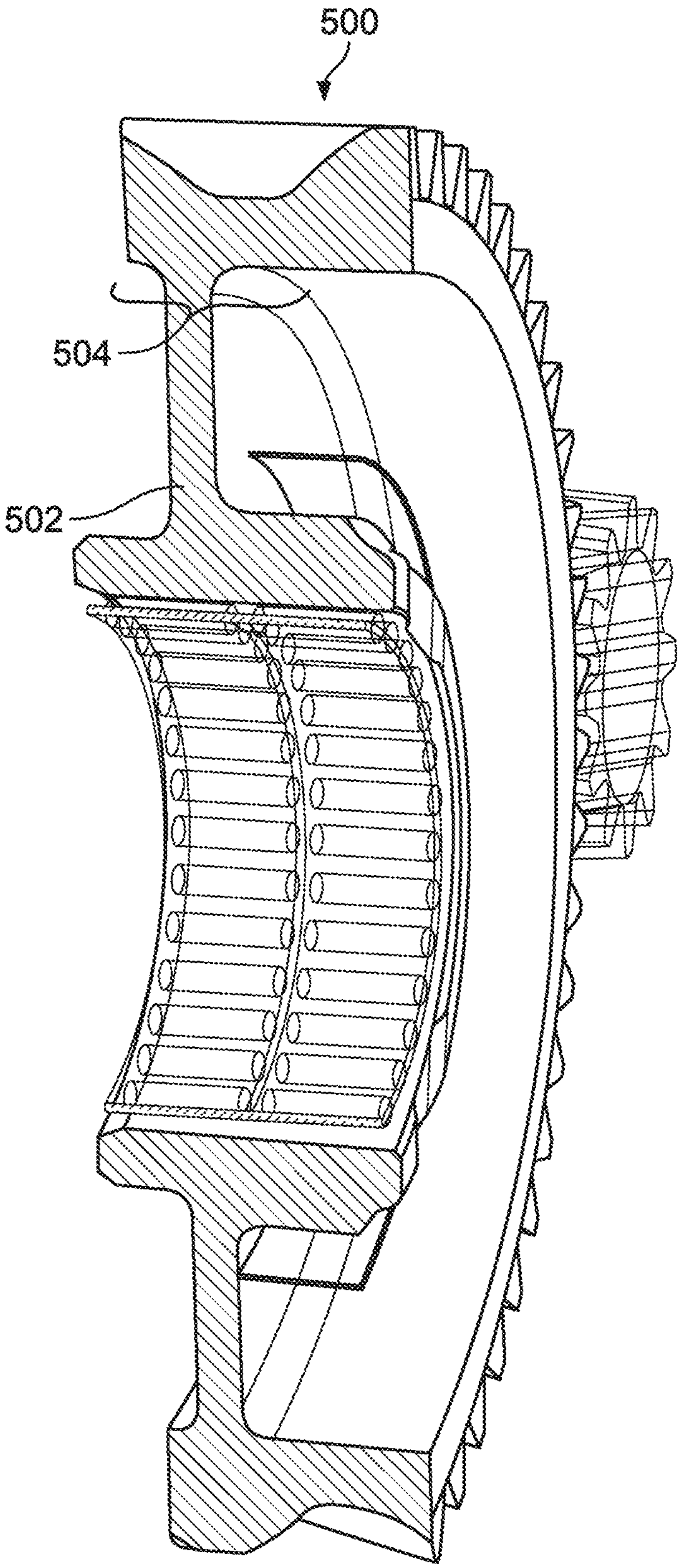
FIG. 5A depicts an example embodiment of a single-disc design of the gear assembly of the present disclosure that addresses and overcomes the deficiencies of the gear assemblies having a conventional design, according to one or more embodiments described and illustrated herein.

FIG. 5A depicts a single-disc design 500 of the gear assembly, according to examples of the present disclosure. In FIG. 5A, the single-disc design 500 addresses and overcomes the deficiencies of the gear assemblies having a conventional design. For example, FIG. 5A depicts a gear assembly having the single disc design 500 with a disc 502 having a thickness 504 that is lower than the thickness of conventional gear assemblies such as the gear assembly 100 depicted in FIG. 1. In various examples, the single-disc design 500 is more compliant and flexible compared to conventional disc designs. In examples, the single-disc design 500 is suitable for operations involving loads being applied in a single direction or orientation of rotation. For example, the single-disc design 500 provides a high level of flexibility as compared to conventional designs because of the geometry of the single disc 502 and the value of the thickness 504. In examples, the use of a thin disc design such as, e.g., the design of the thin disc 404 discussed above with respect to FIG. 4, and the arrangements described below and illustrated in FIGS. 5B-5D, facilitate the shifting of the natural frequencies of the gears out of critical regions. The natural frequency is obtained by dividing a stiffness of a component by the mass of the component, and taking a square root of the value from the division.

Figure 5B:
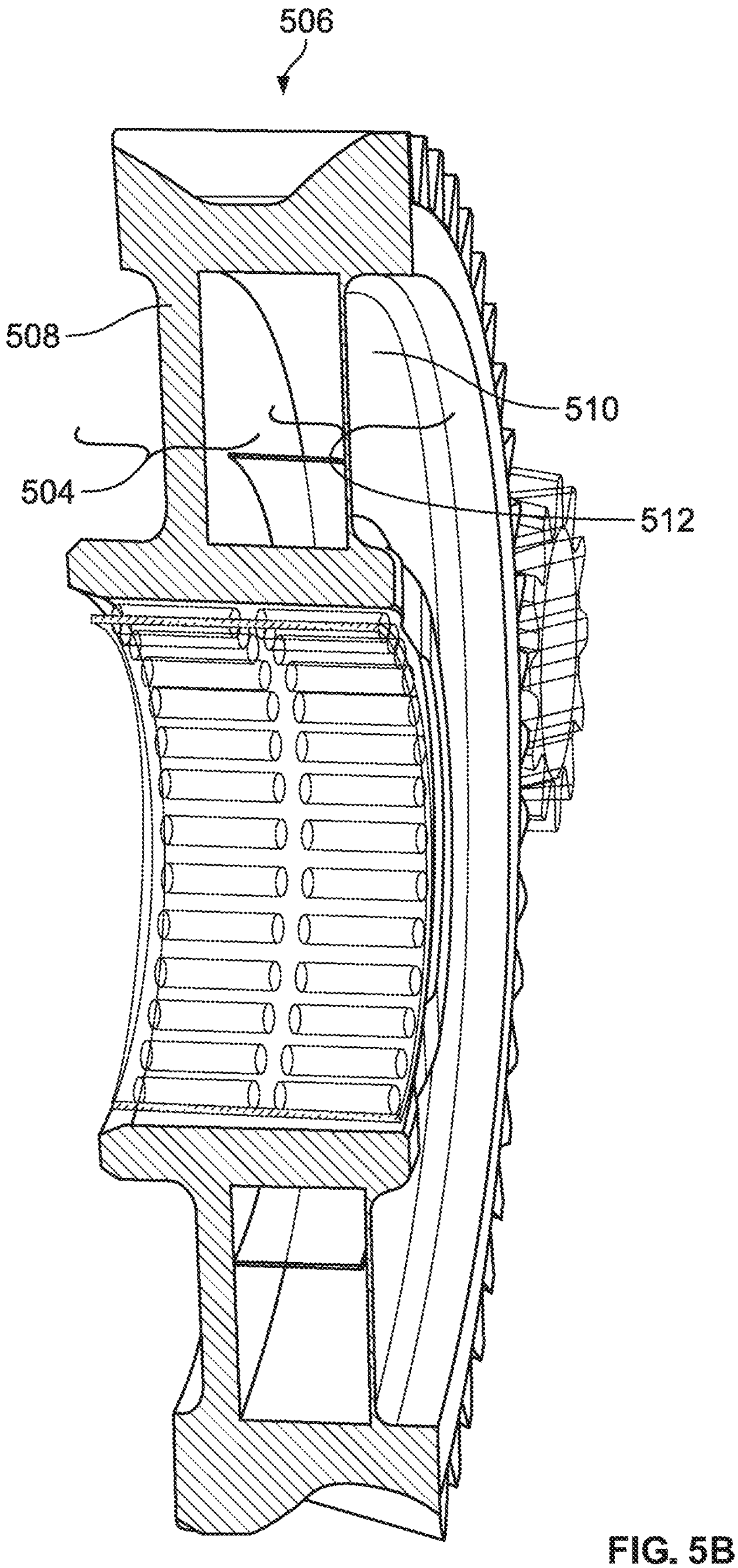
FIG. 5B depicts an example embodiment of a dual-disc design of the gear assembly of the present disclosure that addresses and overcomes the deficiencies of the gear assemblies having the conventional design, according to one or more embodiments described and illustrated herein.

FIG. 5B depicts an example of a dual-disc design of the gear assembly of the present disclosure that addresses and overcomes the deficiencies of the gear assemblies having a conventional design. As compared to the single-disc design illustrated in FIG. 5A, the dual-disc design 506 of the gear assembly illustrated in FIG. 5B includes a first disc 508 having a thickness 504 and a second disc 510 having a thickness 512. For example, the thickness 504 in FIG. 5B may be identical to the thickness 504 of the single-disc design 500 illustrated in FIG. 5A, and the second disc 510 may have a thickness 512 that is lower than thickness 504. In various examples, an orientation of the second disc 510 is parallel to the orientation of the first disc 508. In various examples, the dual-disc design 506 provides additional advantages compared to single-disc designs in that the dual disc design 506 is better suited to enable operations involving loads that are applied in multiple directions or orientations of rotation. In another example, the first disc 508 and the second disc 510 may have the same thickness.

Figure 5C:
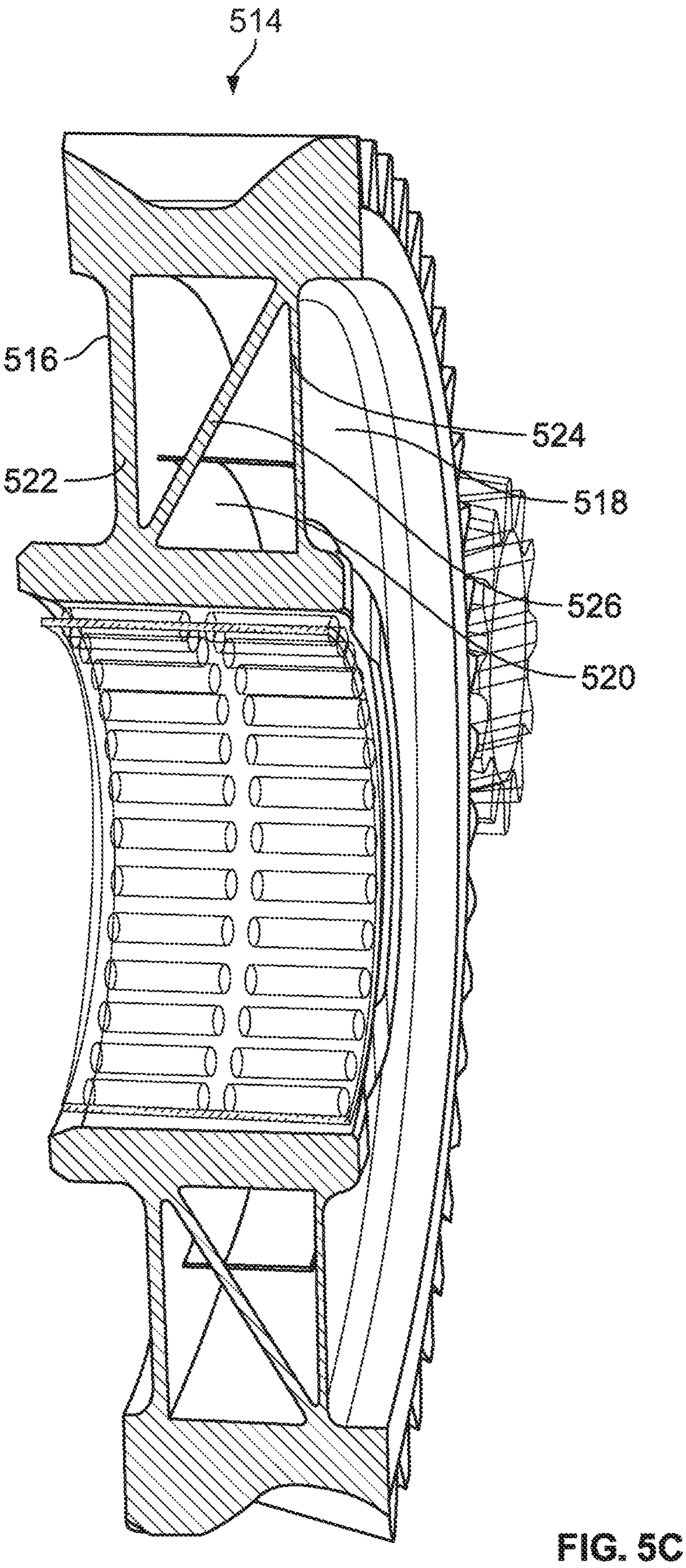
FIG. 5C depicts an example embodiment of a triple-disc design of the gear assembly of the present disclosure that addresses and overcomes the deficiencies of the gear assemblies having the conventional design, according to one or more embodiments described and illustrated herein.

FIG. 5C depicts a triple-disc design 514 of the gear assembly, in accordance with various examples of the present disclosure, that addresses and overcomes the deficiencies of the gear assemblies having a conventional design. In examples, the triple disc design 514 may include a first disc element 516, a second disc element 518, and a third disc element 520. In various examples, the first disc element 516 may have a thickness 522, the second disc element 518 may have a thickness 524, and the third disc element 520 may have a thickness 526. In examples, the third disc element 520 is similar to, or has the shape of, a truncated circular cone. In an example, the triple-disc design 514 may be more rigid than conventional disc designs, but is more flexible and compliant as compared to the gear assembly having the conventional design as illustrated in FIG. 1. In other examples, the thicknesses 522, 524, 526 may be substantially similar. In examples, the thickness 524 may be marginally lower than the thicknesses 522, 526.

Figure 5D:
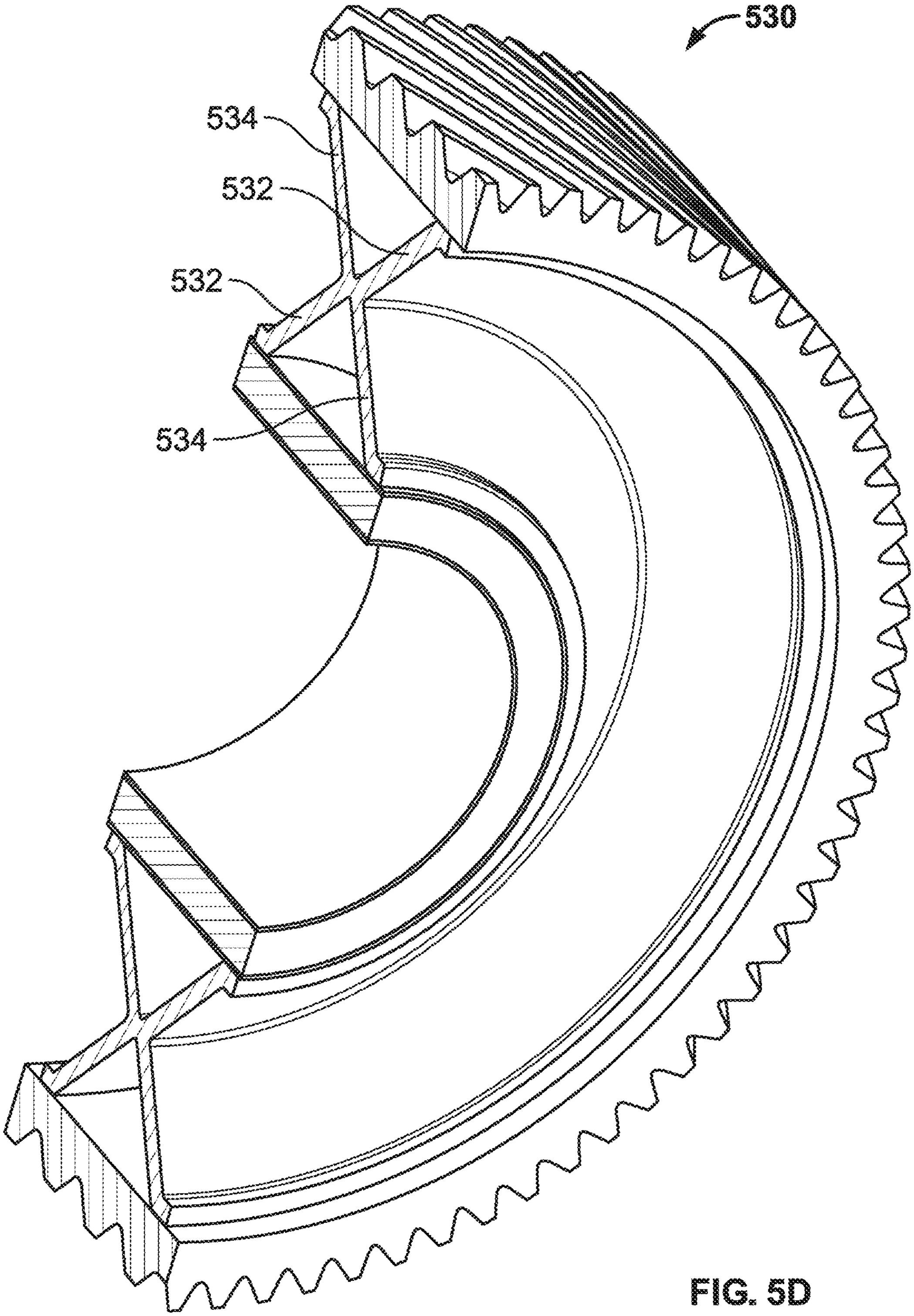
FIG. 5D depicts a dual cone design of the gear assembly of the present disclosure that addresses and overcomes the deficiencies of gear assemblies having conventional design, according to one or more embodiments described and illustrated herein.

FIG. 5D depicts a dual cone design 530 of the gear assembly, according to various examples of the present disclosure, that addresses and overcomes the deficiencies of gear assemblies having conventional designs. In various examples, the dual-cone design 530 includes disc components 532 and 534 that are designed in a crisscrossing orientation, as illustrated in FIG. 5D. It is noted the disc components 532, 534, when configured in such an orientation, provide various advantages. For example, the dual cone design 530 enables effective operation in situations that involve loads that are applied in multiple directions or orientations of rotation. In embodiments, the dual cone design 530 is suitable to operate effectively in various electric vehicles and electrical vehicle operations. It is further noted that the crisscrossing orientation of the dual cone design 530 may have significantly more flexibility and compliance as compared to a conventional gear assembly as illustrated in FIG. 1.

Figure 5E:
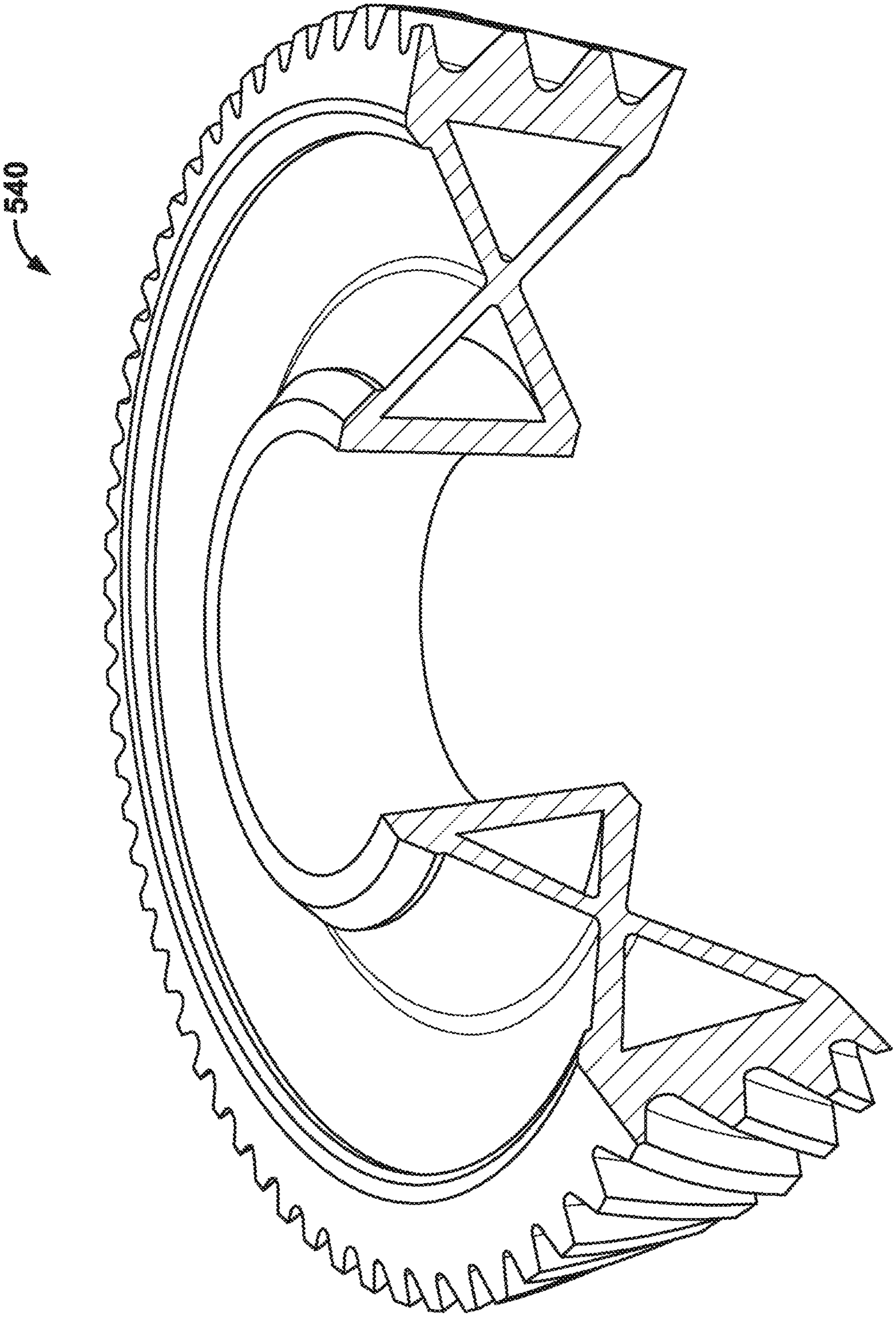
FIG. 5E depicts an example image of a machined gear assembly having the dual cone design of the present disclosure, according to one or more embodiments described and illustrated herein.

In various examples, multiple gears with the dual cone design 530 may be designed and welded to the shaft as part of, e.g., a four-speed transmission. FIG. 5E depicts an example image of a machined gear assembly 540 having the example dual cone design 530 of the present disclosure. In various examples, the machined gear assembly 540 may be formed of, or include, stainless steel, or a high strength and low-alloy steel such as, e.g., ASTM A572, that offers a combination of strength, weldability, and notch rigidity. Additionally, ASTM A572 may be cost effective compared to materials conventionally used to manufacture gear assemblies. In various examples, the machined gear assembly 540 may also be formed of 1045 steel, that is made of common steel grade, but that has high strength, moderate weldability, and good impact properties. It is noted that 1045 steel is widely used in a variety of industrial applications, e.g., gears, pins, rams, shafts, sockets, rolls, axles, spindles, worms, ratchets, light gears, bolts, crankshafts, guide rods, etc. In other examples, the machined gear assembly 540 may also be formed of 8620 steel, which is a low carbon nickel chromium molybdenum alloy steel. In various examples, a gear assembly having the dual cone design 530 may be machined from a single piece of steel, in contrast to being formed from a stamping process using ASTM A572. After completion of the machining process, the ring gear and the hub may be welded to the machined steel component in order to complete the gear assembly, in accordance with other examples.

Figure 6:
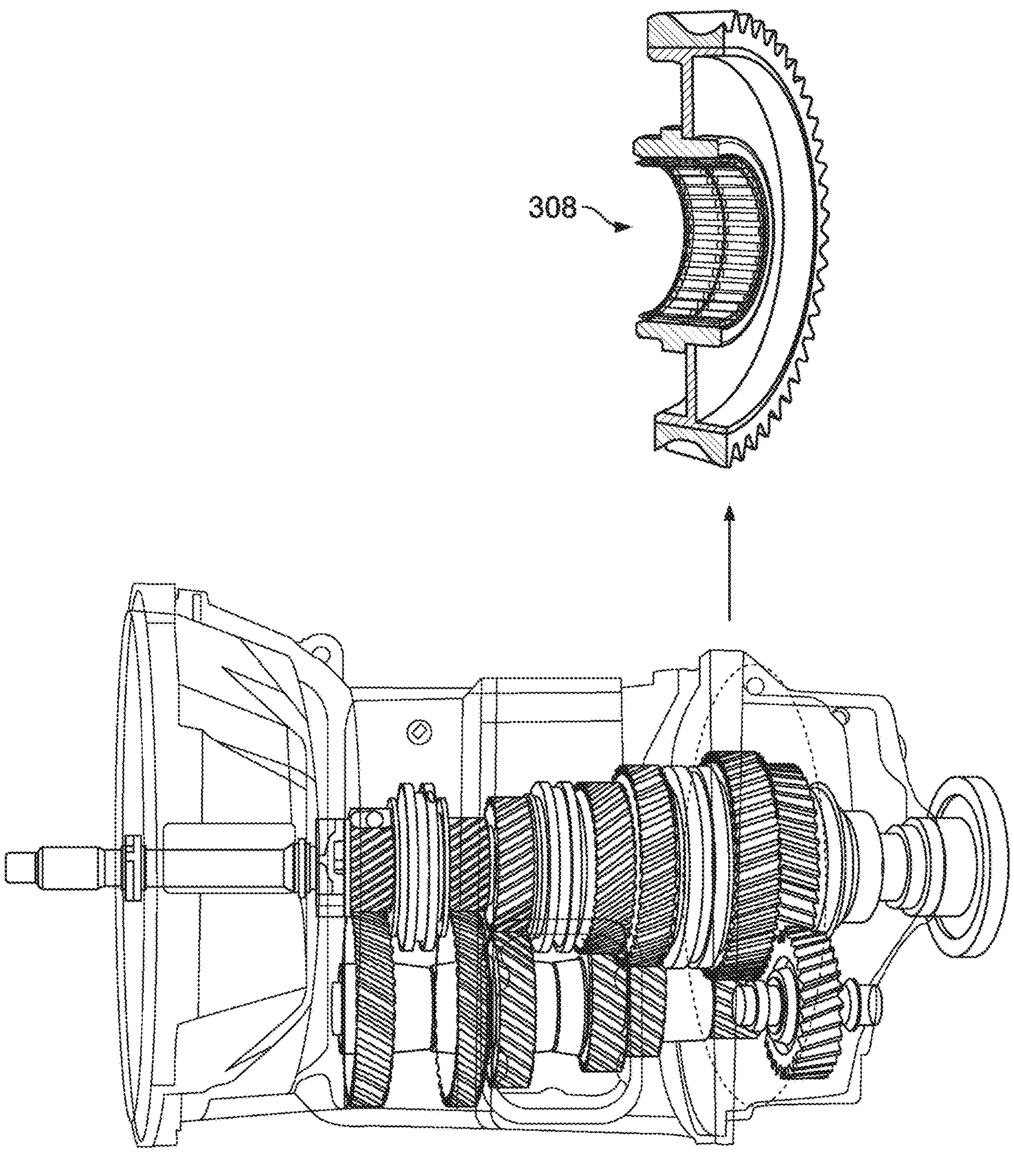
FIG. 6 depicts an example positioning of the gear assembly within a transmission of a vehicle, according to one or more embodiments described and illustrated herein.

FIG. 6 depicts an example positioning of the gear assembly 300 of the present disclosure within a transmission of a vehicle. In various examples, the gear assembly 300 may have a lower mass of 3.78 kilograms as compared to a mass of 5.03 kilograms of a conventional gear assembly. As such, the gear assembly 300 has the advantage of being lighter, which enables a lighter and more efficient vehicle, as well as reduces noise during operation. In various examples, the gear assembly 300 may have superior NVH characteristics as compared to a conventional gear assembly such as, e.g., gear assembly 100 illustrated in FIG. 1.

Figure 7:
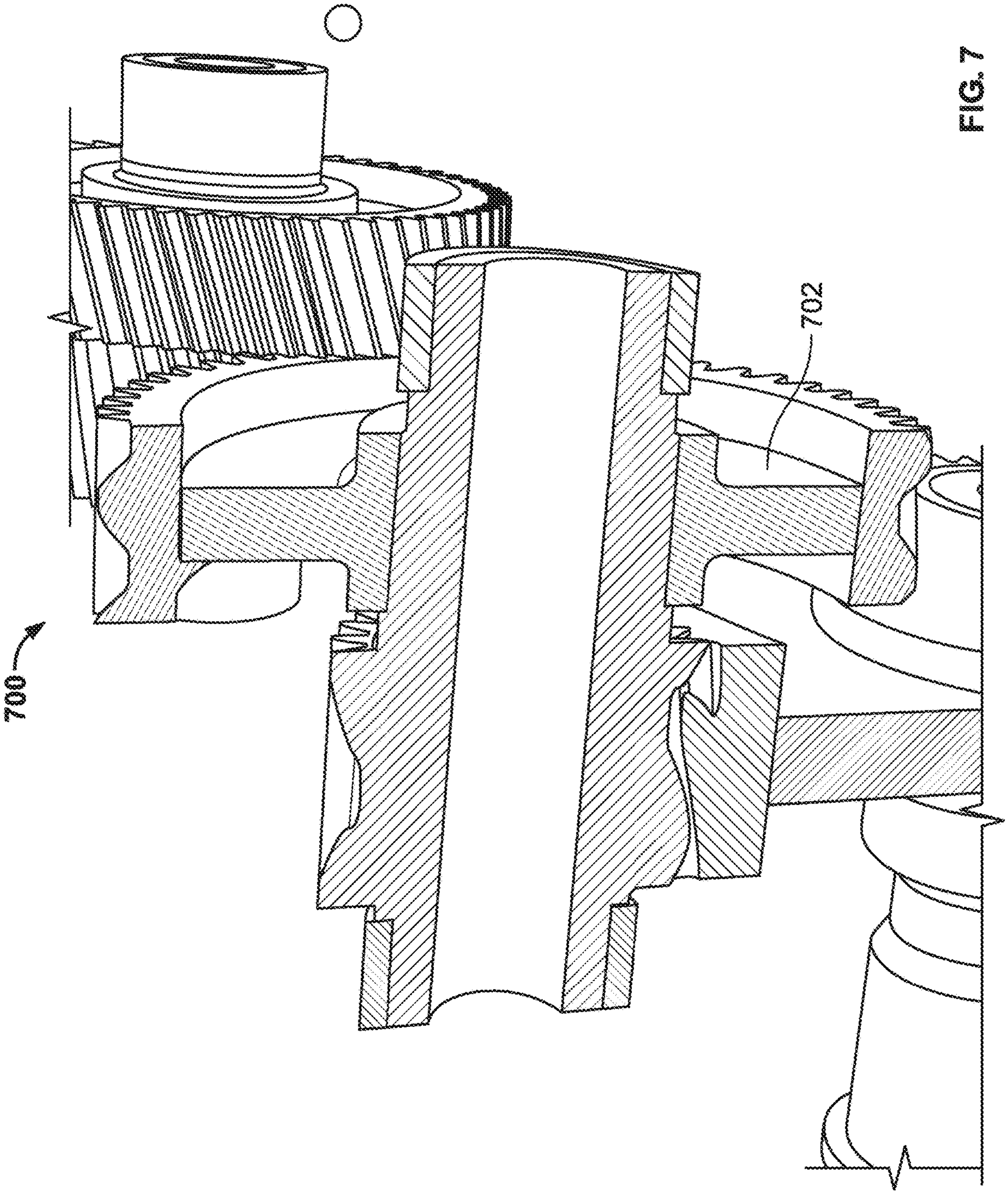
FIG. 7 depicts an example of a conventional electrical vehicle drive unit in which a conventional gear assembly is positioned.

FIG. 7 depicts an example of a conventional electrical vehicle drive unit 700 in which a conventional gear assembly 702 is positioned. As illustrated, the gear assembly 702 may have a total weight of, e.g., 9.097 kilograms. In embodiments, the weight of 9.097 kilograms may be a baseline and/or average weight of gear assemblies currently in operation.

Figure 8:
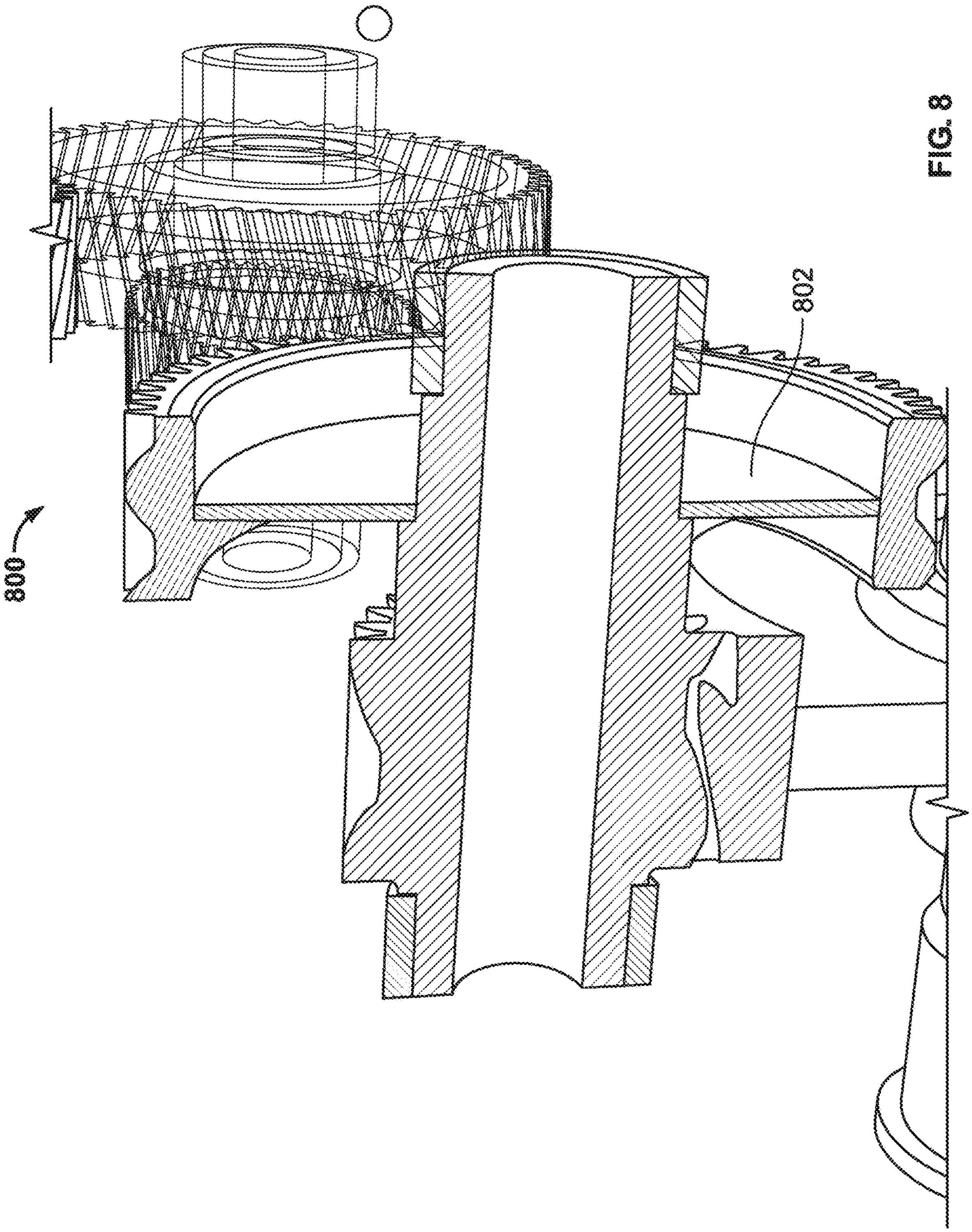
FIG. 8 depicts an example electric vehicle drive unit in which an example gear assembly is positioned.

FIG. 8 depicts an example electric vehicle drive unit 800 in which an example gear assembly 802, as described in examples of the present disclosure, may be positioned. As compared to the gear assembly 702 of FIG. 7, the gear assembly illustrated in FIG. 8 may have a substantially lower total weight of, e.g., 4.945 kilograms, and such a reduced weight enables the gear assembly 802 to operate such that noise produced as a result of vibrations associated with the rotation of the gear assembly 802 is significantly lower as compared to the noise produced by the gear assembly 702.

Figure 9:
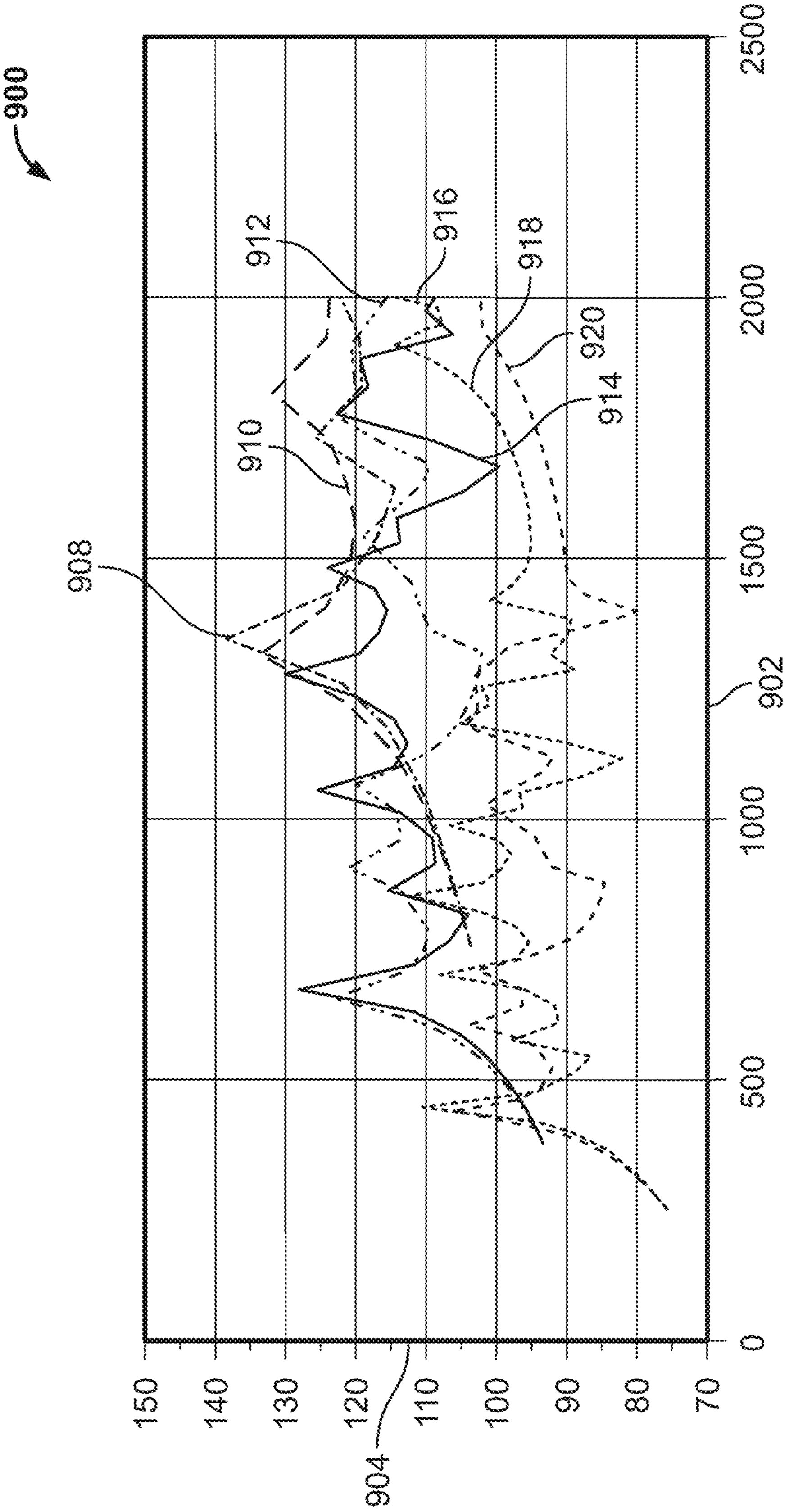
FIG. 9 depicts an example graphical representation of dynamic responses of a conventional gear assembly as compared to dynamic responses of the gear assembly as described in the present disclosure, according to one or more embodiments described and illustrated herein.

FIG. 9 depicts an example graphical representation 900 of dynamic responses of a conventional gear assembly 100 compared to dynamic responses of the gear assembly as described in examples of the present disclosure. For example, the x-axis 902 of the graphical representation 900 corresponds to rotations per minute (rpm), and the y-axis 904 corresponds to velocity values that are associated with vibrations resulting from the operation of the conventional gear assembly 100 and operation of the gear assemblies illustrated in FIGS. 5A-5E. Representation 900 includes a plot of the first harmonic 908 (1H), of the second harmonic 914 (2H), and of the third harmonic 918 (3H) of a conventional gear assembly. Representation 900 also includes a plot of the first harmonic (1H) 910, of the second harmonic 912 (2H), and of the third harmonic 920 (3H) of a gear assembly according to the various examples of this disclosure as, e.g., illustrated in FIGS. 5A-5E. In various examples, the vibration values associated with each of the harmonics 908, 914, 918 may be equal to, e.g., 139 decibels (dB), 130 dB, and 115 dB, respectively. In contrast, the vibration values associated with each of the harmonics 910, 912, 920 may be equal to, e.g., 134 dB, 123 dB, and 106 dB, respectively.

Figure 10:
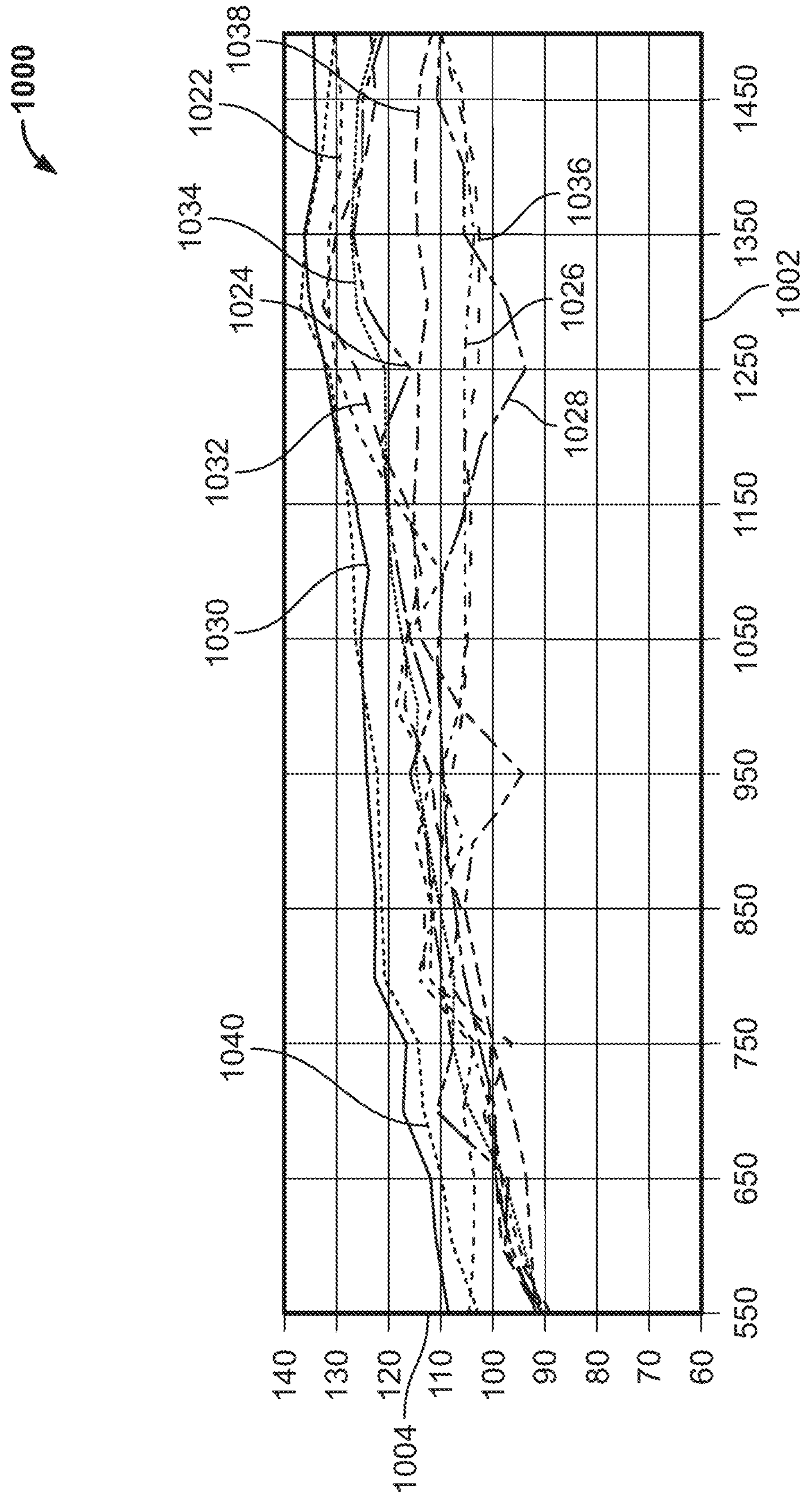
FIG. 10 depicts another example graphical representation of dynamic responses of a conventional gear assembly as compared to dynamic responses of the gear assembly that were measured using an accelerometer positioned on an enclosure of each of the conventional gear assemblies and the gear assembly of the present disclosure, according to one or more embodiments described and illustrated herein.

FIG. 10 depicts another example graphical representation 1000 of dynamic responses of a conventional gear assembly 100 as compared to dynamic responses of the gear assembly that were measured using an accelerometer positioned on an enclosure of each of the conventional gear assembly and the example gear assembly of the present disclosure. As illustrated, an x-axis 1002 of the graphical representation 1000 is associated with rotations per minute (rpm) and the y-axis 1004 is associated with vibrations that are measured using the accelerometer that may be disposed on an exterior portion of an enclosure in which the conventional gear assembly 100 may be disposed, and an exterior portion of the enclosure in which the gear assembly as described in the present disclosure may be disposed.

The rotational speed (represented by rpms) of each of the gears is varied from a range of approximately 550 rpms to 1500 rpms, and the vibration data of each of the gear assemblies over this range is measured and illustrated in FIG. 10. In examples, lines 1022, 1024, 1026, 1028, and 1030 correspond to the vibrations values of the conventional gear assembly 100 in each of the first harmonic, the second harmonic, the third harmonic, a fourth harmonic, and a harmonic order sum, traced over approximately 550 rpms to 1500 rpms. In contrast, lines 1032, 1034, 1036, 1038, and 1040 correspond to the vibration values of the example gear assembly of the present disclosure, as illustrated in FIGS. 5A-5B, traced over a range of approximately 550 rpms to 1500 rpms.

Additionally, the plotted lines 1032, 1034, 1036, 1038, and 1040 correspond to the vibration values of the gear assembly as described in the present disclosure in each of the first harmonic, the second harmonic, the third harmonic, the fourth harmonic, and the harmonic order sum. As illustrated, the vibration values associated with the gear assembly of the present disclosure, when in operation, are lower as compared to the vibrations associated with the conventional gear assembly 100. Specifically, the vibration values across all harmonics are lower by approximately 1 dB to 2 dB.

Although various examples and examples are described herein, those of ordinary skill in the art will understand that many modifications may be made thereto within the scope of the present disclosure. Accordingly, it is not intended that the scope of the disclosure in any way be limited by the examples provided.

The invention claimed is:

1. A gear assembly comprising:
- a shaft;
- at least one disc; and
- a ring gear component;
- wherein two or more of the shaft, the at least one disc, and the ring gear component are welded together;
- wherein the at least one disc comprises a dual disc configuration, the dual disc configuration comprising:
  - a first disc; and
  - a second disc, wherein the first disc and the second disc are oriented so that the first disc and the second disc cross each other;
- wherein first radial ends of each of the first disc and the second disc are joined to the shaft, and each of second radial ends of each of the first disc and the second disc are joined to the ring gear, wherein a distal end of the second radial end of the first disc extends in an axial direction towards a first end of the shaft and a distal end of the second radial end of the second disc extends in an axial direction towards a second end of the shaft.

2. The gear assembly of claim 1, wherein the shaft, the at least one disc, and the ring gear component are welded together at a plurality of weld joints.

3. The gear assembly of claim 1, wherein the at least one disc comprises at least one of an ASTM A572 material and a 8620 steel material.

4. The gear assembly of claim 1, wherein the second disc has a same thickness as the first disc.

5. The gear assembly of claim 1, wherein a vibration noise of the gear assembly is in a range of 106-134 dB, wherein a first harmonic of the vibration noise is equal to about 134 dB, a second harmonic of the vibration noise is equal to about 123 dB, and a third harmonic of the vibration noise is equal to about 106 dB.

6. A shaft assembly comprising:

a shaft extending between a first end and a second end;

a ring gear; and at least one disc operatively coupling the ring gear to the shaft and extending between a first radial end proximate the shaft and a second radial end proximate the ring gear, wherein at least a distal end of the second radial end extends in an axial direction towards the shaft first end, and the distal end extending in the axial direction is joined to the ring gear;

wherein the at least one disc comprises a dual disc configuration, the dual disc configuration comprising:

a first disc; and a second disc having a same thickness as the first disc;

wherein the first disc and the second disc are oriented so that the first disc and the second disc cross each other;

wherein the first disc and the second disc are formed from a single piece of steel.

7. The shaft assembly of claim 6, wherein the second radial end of the at least one disc is directly attached to the shaft.

8. The shaft assembly of claim 7, wherein the first radial end of the at least one disc is directly attached to the ring gear.

9. The shaft assembly of claim 6, wherein each of the first and second discs include first radial ends and second radial ends.

10. The gear assembly of claim 9, wherein the first radial ends of each of the first disc and the second disc are joined to the shaft, and each of second radial ends of the first and second discs are joined to the ring gear, and the distal end of the second radial end extends in an axial direction towards the second end of the shaft.

* * * * *